April 14, 1964  C. E. CAMERON  3,128,742
POWER TRANSMISSION

Filed June 7, 1961  5 Sheets-Sheet 1

INVENTOR.
COLIN E. CAMERON
BY
*M. A. Hobbs*
ATTORNEY

April 14, 1964    C. E. CAMERON    3,128,742
POWER TRANSMISSION

Filed June 7, 1961    5 Sheets-Sheet 2

INVENTOR.
COLIN E. CAMERON
BY M. A. Hobbs
ATTORNEY

INVENTOR.
COLIN E. CAMERON

INVENTOR.
COLIN E. CAMERON

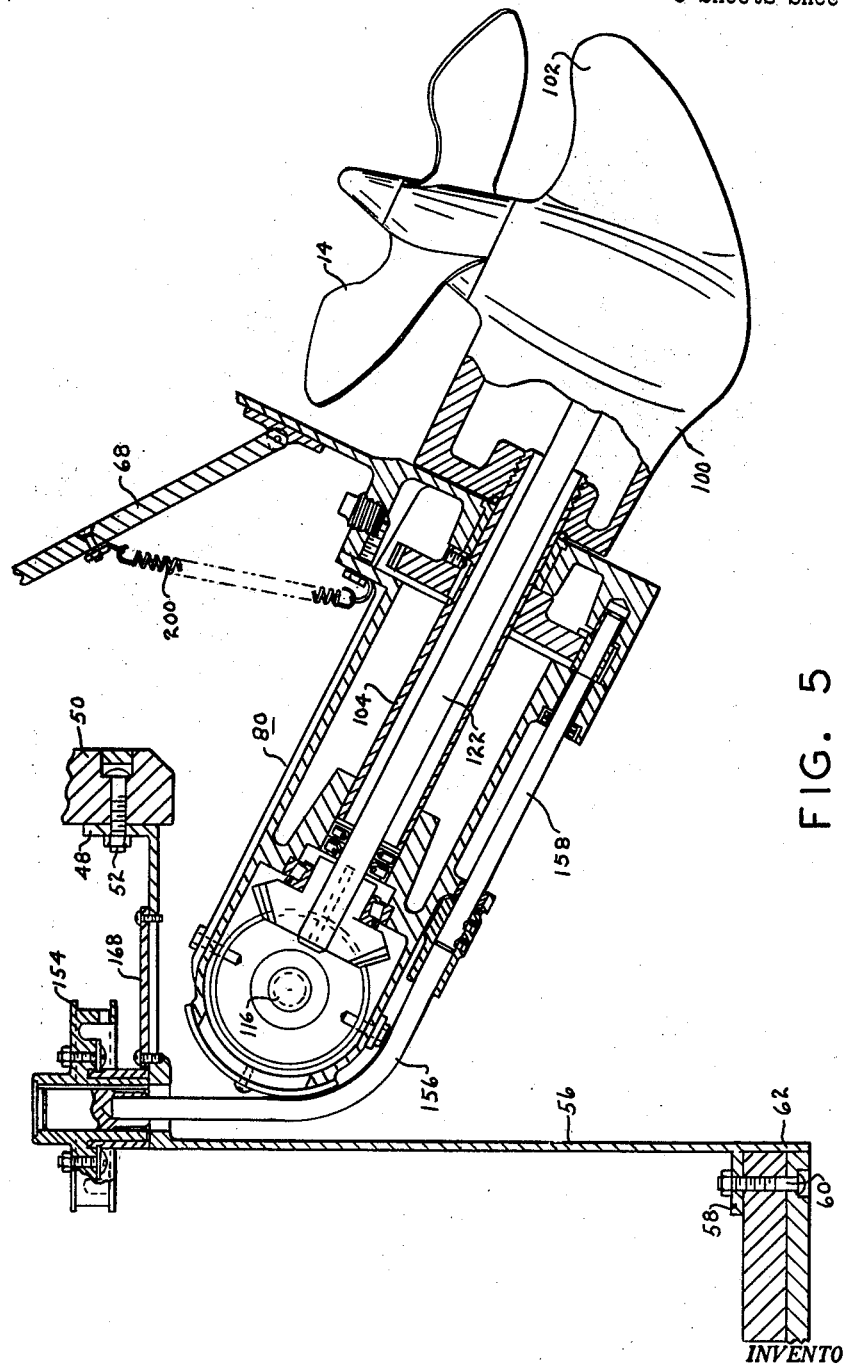

United States Patent Office 3,128,742
Patented Apr. 14, 1964

3,128,742
POWER TRANSMISSION
Colin E. Cameron, 201 6th, Winona Lake, Ind.
Filed June 7, 1961, Ser. No. 115,526
3 Claims. (Cl. 115—37)

The present invention relates to boat power transmissions and more particularly to inboard power transmissions for either single or twin screw propulsion.

Demands by the boating public for increased power for outboard boats has resulted in the outboard motor's being increased in power, size and weight to the extent that those which provide the required power are so large that they are cumbersome, inefficient and uneconomical to operate. Further, the sheer increased weight has made installation and/or satisfactory operation impossible, particularly on the smaller classes of outboard motors. In view of these disadvantages in the large outboard motors, there has been a recent trend toward conventional inboard motors and toward inboard motors with outboard drives. The inboard motors are of well known, conventional construction and installation with the propeller shaft passing through the bottom of the boat and remaining in fixed position beneath the boat. These inboard motor installations are particularly vulnerable to breakage and other damage from underwater obstructions, such as stumps, logs, stones and shallow river, lake and channel bottoms, and to leakage around and through the propeller shaft bearing mount where it passes through the boat hull. The inboard motor-outboard drive which has been increasing in popularity has the advantage of the heavy motor being completely within the boat, where no handling by the boat operator is required and where it is well protected, and easily refueled, started and serviced. The outboard propeller transmission is mounted on the transom of the boat and is usually pivoted to permit raising and lowering of the propeller. For the larger boats, in particular, the outboard transmission is not only large and hard to manipulate to raise and lower the propeller but it projects outwardly behind to the extent that it interferes with maneuvering of the boat, including removing the boat from the water onto trailers and slips.

It is therefore one of the principal objects of the invention to provide a power plant for boats combining into a single unit the advantages, without the disadvantages, of the aforementioned inboard motor and outboard propeller drive.

Another object of the present invention is to provide a power plant for boats of the aforesaid type in which the motor is mounted inboard and the propeller drives are mounted within the boat and tiltable to raise the propeller from a position beneath the boat to a position behind the transom.

Another object of the invention is to provide a propeller drive assembly for boats which can readily be installed on conventional boats without making any changes or modifications in basic construction of the boat hull and which combines into one integral unit the advantages of a conventional inboard motor and drive with those of an outboard motor.

A further object is to provide a power drive mechanism for twin propeller driven boats, which is adapted to be used with a single inboard engine mounted on a stationary support in the center of the boat and which contains a pivot construction permitting one or both propellers to be tilted automatically to avoid damage from underwater obstructions and to be easily tilted by the operator to raise and lower the propeller.

Another object is to provide a power transmission for either a single or a twin propeller boat, including a vertically disposed housing mounted on a horizontal axis for easy tilting to and from operating position and on a vertical axis for steering the boat, through a simple linkage from a remotely positioned wheel or other controls.

Another object of the invention is to provide a power plant of the aforesaid type in which the transom appears unbroken and without projections when the propellers are in their operating position.

Additional objects and advantages of the invention will become apparent from the following description and accompanying drawings, wherein:

FIGURE 5 is a vertical cross-sectinal view of the power transmission, taken on line 5—5 of FIGURE 3 and showing the propeller in its raised position;

Figure 1:
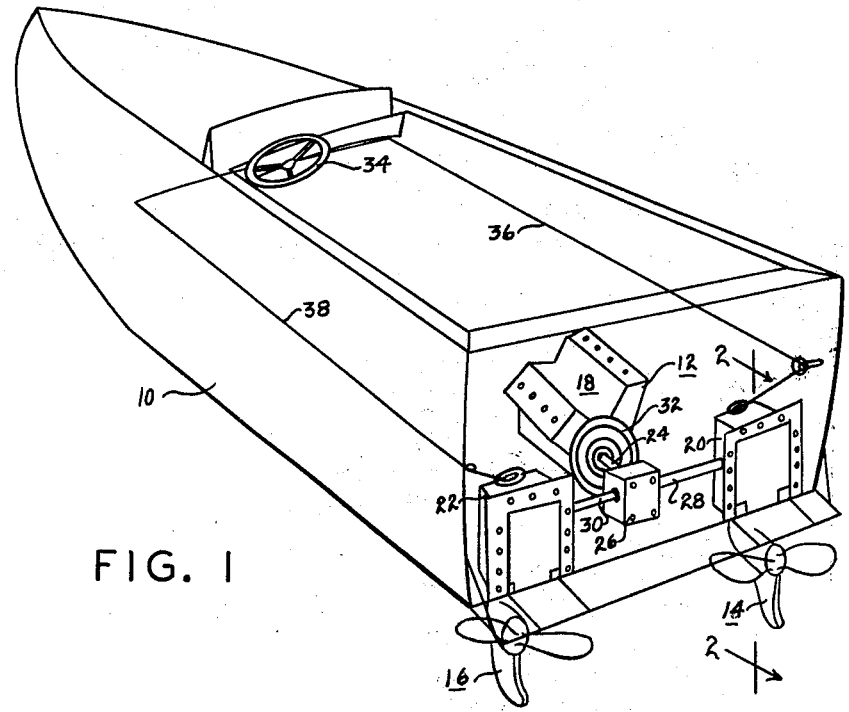
FIGURE 1 is an outline view of a boat showing my power transmission for a twin propeller drive mounted therein and driven by an inboard motor, the power transmission and motor being shown in perspective.
Figure 4:
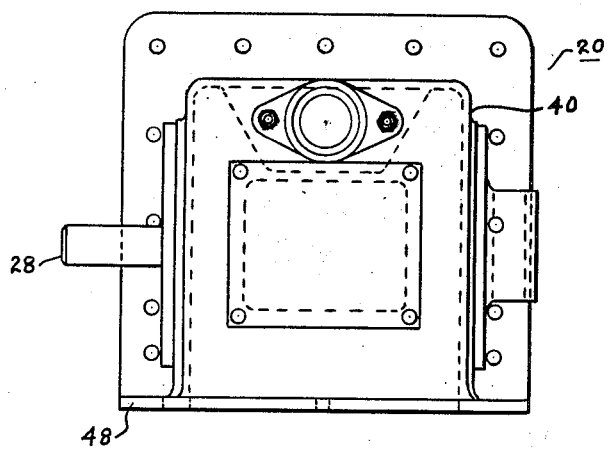
FIGURE 4 is a top plan view of the power transmission shown in FIGURES 2 and 3.

Referring more specifically to the drawings and FIGURE 1 in particular, numeral 10 designates a conventional boat, and 12 a power plant for twin propellers 14 and 16 embodying my invention, the power plant consisting generally of an inboard gasoline engine 18 connected to power drive units 20 and 22 by a shaft 24, power take-off 26 and shafts 28 and 30, respectively. The engine 18 may be considered conventional for the purpose of the present description and includes a standard marine reverse gear contained in housing 32 on the engine. When the power drives are in operation, the entire power unit is contained within the boat with the propellers and lower ends of the power drive units projecting downwardly beneath the hull of the boat. Engine 18 is a standard gasoline marine engine of conventional design and is preferably rigidly mounted on a base in the bottom of the boat. The power plant including the engine and power drives 20 and 22 and power take-off can be used in conjunction with various types and sizes of boats, the one shown being merely for the purpose of illustration and having a steering wheel 34 connected by cables 36 and 38 to the steering mechanism of power units 20 and 22.

The two power units 20 and 22 are identical in construction and operation with the exception that shafts 28 and 30 extend outwardly in opposite directions from the two power drive units. In view of the close similarity between the two power drive units only one will be described in detail herein with the same numerals with primes designating like parts in the other unit. Power unit 20 consists of a housing 40 of generally rectangular shape having side panels 42 and 44 and top panel 46 joined by a U-shaped flange 48 to the inside of transom 50 by a plurality of bolts 52 extending through spaced holes 54 in flange 48 and through holes in the transom. The front of housing 40 is closed by a panel 56 joined integrally to the two side panels and top panel, the lower edges of the two side and front panels having a U-shaped flange 58 adapted to seat on the bottom of the boat and to be bolted in sealed relationship thereto by a plurality of bolts 60 extending downwardly through the flange and through the bottom of the boat. The lower edges of the two side panels and front panel have an extendsion 62 which projects downwardly into or through a rectangular hole 64 in the bottom of the boat beneath housing 40. The transom 50 contains an opening 66 of substantially the same size and shape as the interior of housing 40, the opening being closed by a slidable door 68 pivoted on a projection 70 on the rear portion of the power drive in a manner more fully described hereinafter.

Figure 2:
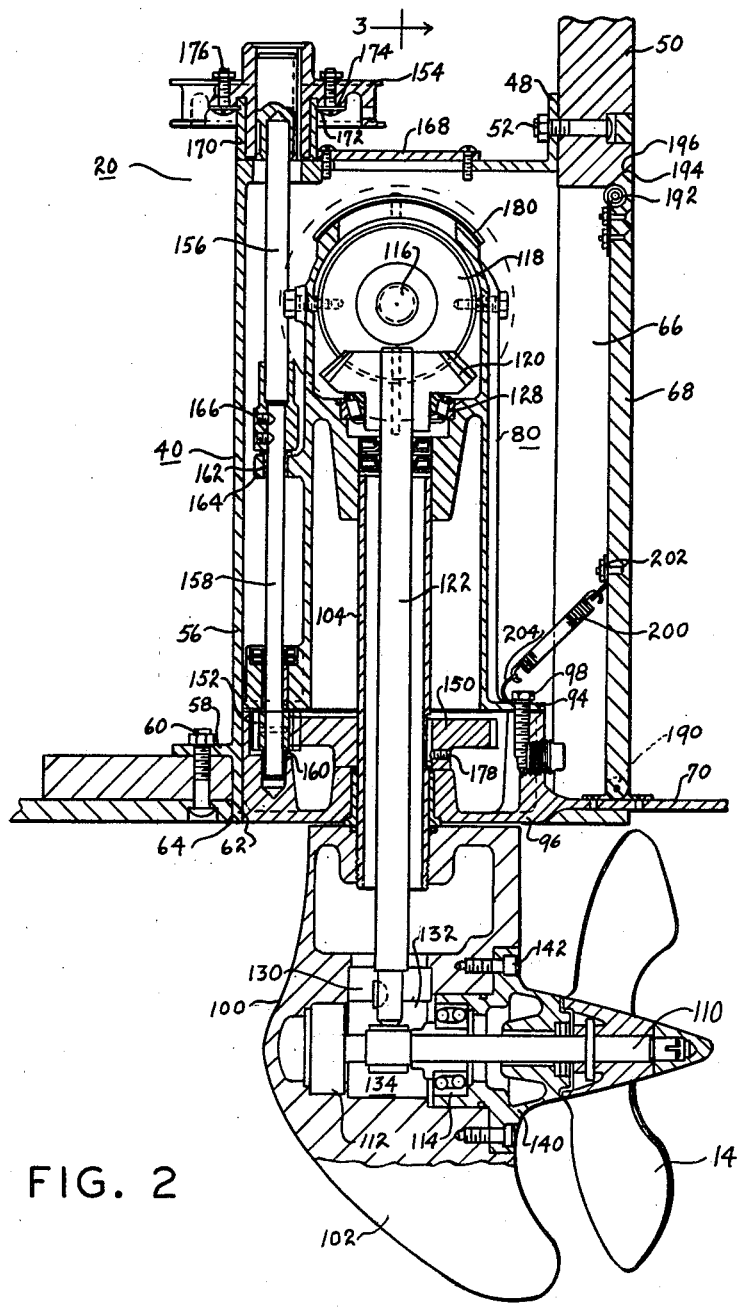
FIGURE 2 is a vertical cross-sectional view of one of the power transmissions for one of the twin propellers, taken on line 2—2 of FIGURE 1, showing the drive in its boat propelling position.
Figure 3:
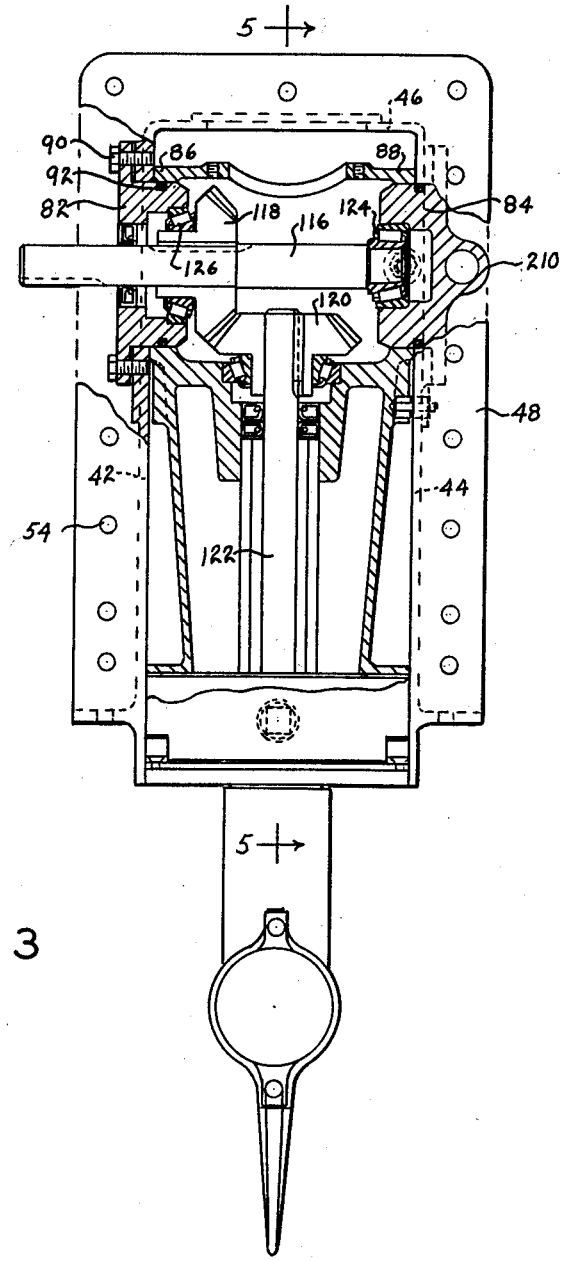
FIGURE 3 is a vertical cross-sectional view through the present power transmission taken on line 3—3 of FIGURE 2.
Figure 3:
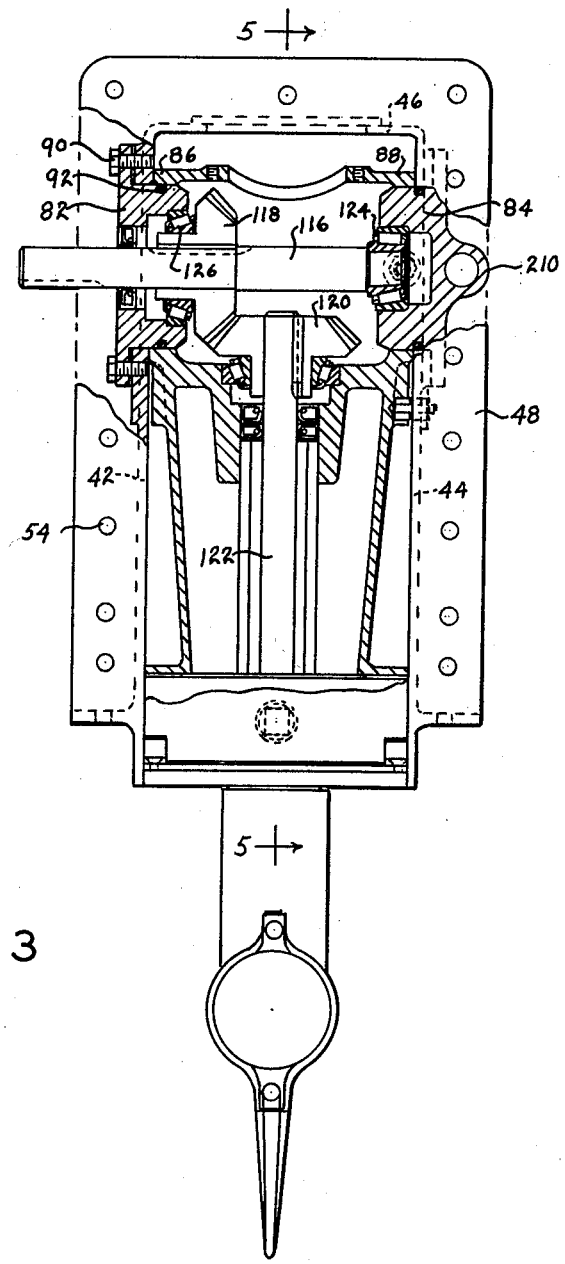

A body 80 is pivotally mounted in housing 40 on hubs 82 and 84 extending into bearings 86 and 88 in the upper end of body 80, the hubs being secured to the sides 42 and 44 by a plurality of bolts 90, and bearings 86 and 88 are maintained in a fluid-tight relationship with the respective hub by an O-ring gasket 92 around the hub. With body 80 mounted in this manner, it is adapted to swing from its vertical position as shown in FIGURE 2 to the horizontal position shown in FIGURE 5 or to any intermediate position, rotating on hubs 82 and 84. The lower end of body 80 terminates in an outwardly extending flange 94 to which is secured a collar 96 by a plurality of bolts 98 extending downwardly through flange 94 into collar 96, projection 70 being joined to and forming a part of collar 96. A leg 100 having a fin 102 is rotatably mounted beneath body 80 and is supported in this position by a sleeve 104 extending vertically in the center of body 80 and projecting downwardly therefrom. Propeller 14 is mounted on a horizontal shaft 110 journaled in bearings 112 and 114 in leg 100 and is driven by shaft 28 through a horizontal shaft 116, beveled gears 118 and 120, and shafts 122 and 110. Gears 118 and 120 are mounted on and joined securely to shafts 116 and 122, respectively. Shaft 116 is journaled in hub 84 within roller bearings 124, and beveled gear 118 is journaled in roller bearings 126, the two roller bearings forming the supports for shaft 116. Shaft 122 is concentrically disposed in sleeve 104 and is supported at its upper end by bevel gear 120 seated in roller bearing 128 and supported at its lower end in a bearing 130 mounted in leg 100. Shaft 112 is operatively connected to shaft 110 by a pair of beveled gears 132 and 134 mounted on shafts 122 and 110, respectively. The hollow interior of leg 100 is closed by a bushing 140 positioned between propeller 14 and the leg, the bushing 140 being secured to the leg by a plurality of bolts 142.

The boat is steered by rotation of propellers 14 and 16 on their vertical axes, the mechanism for accomplishing this consisting of a gear 150 secured to sleeve 104 on which leg 100 is rigidly mounted, a pinion 152 meshing with gear 150 and rotated by cables 36 and 38 through drum or pulley 154, flexible shaft 156 and shaft 158 on which pinion 152 is mounted. Shaft 158 is journaled at its lower end in a bearing 160 and at its upper end in a bearing 162 supported in a projection 164 on body 80. Flexible shaft 156 is connected to the upper end of shaft 158 by a coupling 166 and is rigidly joined to the hub of pulley 154 for rotation therewith, the pulley being held firmly on the upper end of housing 40 by a bracket 168 having a cylindrical portion 170 with a groove 172 in which a collar 174 is seated and held by a plurality of bolts 176. Rotation of pulley 154 in either direction rotates shafts 156, 158, pinion 152 and gear 150, thereby rotating sleeve 104 and leg 100 to the desired angular position for propeller 14. In order to permit body 80 to rotate on its horizontal axis corresopnding to shaft 116, shaft 156 is constructed of flexible material such as fabric reinforced rubber so that it will follow the contour of the upper cylindrical portion 180 of body 80 when the body is moved from its vertical position as shown in FIGURE 2 to its horizontal position shown in FIGURE 5. After gear 150 has been tightened firmly in place on sleeve 104 by set screw 178, it rests against the upper edge of collar 96 and assists in supporting leg 100 and propeller 14 adjacent the bottom of body 80.

Doors 68 and 68′ will automatically move between closed and open positions as body 80 is moved between its vertical and horizontal positions. The structure for accomplishing this automatic movement consists of a pivoted connection 190 on projection 70, roller 192 on the inner upper edge of the door, a beveled edge 194 on the upper edge of the door, a corresponding beveled edge 196 along the upper edge of opening 66 in the transom, and a spring 200 connected at one end to the door by a fixture 202 and at the other end to a fixture 204 connected to body 80 at flange 94. As body 80 is rotated counter-clockwise as viewed in FIGURES 2 and 5, projection 70 rises and slides door 68 upwardly along the external surface of the transom, the spring 200 urging the door inwardly against the transom so that it moves in a substantially vertical direction throughout the entire movement between the two positions. When the body is returned from its horizontal to its vertical position, the spring urges the door inwardly so that beveled surface 194 of the door seats against beveled surface 196 of the transom, thus fully closing opening 66 and providing a flat, neat exterior surface on the transom.

In the operation of the present power drive with the two units 20 and 22 being connected to the steering wheel 34 by cables 36 and 38, rotation of the steering wheel produces rotation of drum 154 and rotates legs 100 and 100′ equally in either direction simultaneously, thereby steering the boat to any desired position while the motor is driving the respective propellers through power take-off 26. It is seen that the entire mechanism is within the boat except for legs 100 and 100′ and the respective propeller during the entire operation of the present power plant. When it is desired to raise the propeller from the position shown in FIGURE 2 to that shown in FIGURE 5, lever 210 is rotated to move body 80 in a clockwise direction, thereby likewise moving propeller 14 and leg 100 to their substantially horizontal position and simultaneously sliding door 68 upwardly along the external surface of transom 50. After the propeller has been raised in the foregoing manner, lever 210 is locked in position in order to hold the propeller in the raised position. To return the propeller to its operating position, lever 210 is unlocked and moved in the direction to lower the propeller to its original position as shown in FIGURE 2.

Figure 7:
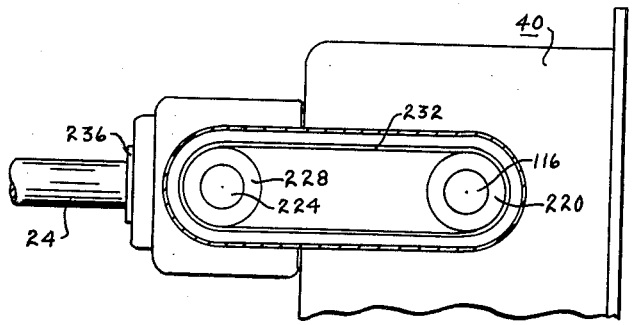
FIGURE 7 is a fragmentary side elevational view of the transmission shown in FIGURE 6 with a portion of the cover thereof removed to better show the drive mechanism.
Figure 6:
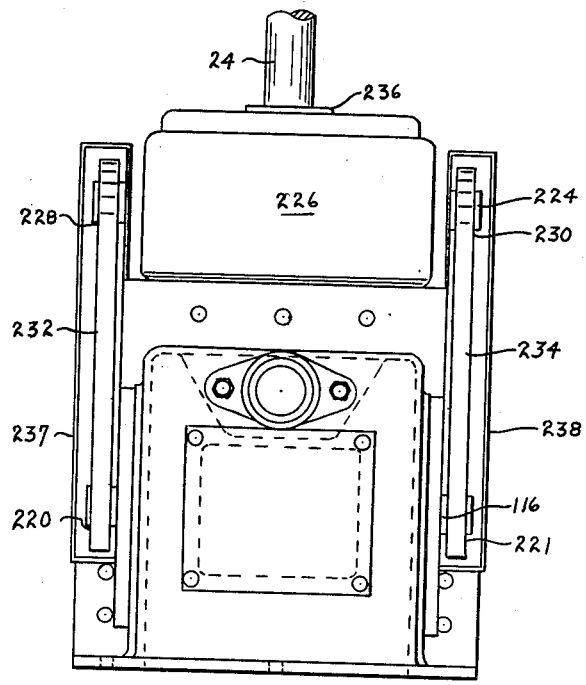
FIGURE 6 is a top plan view of a single propeller power transmission embodying my invention.

The power drive shown in FIGURES 6 and 7 is designed for operating a single propeller from a single inboard engine, the power mechanism being substantially the same as that previously described herein with reference to the twin propeller drive. In the single propeller construction, the body is likewise substantially the same as that previously described; however, the shaft 116 extends through the housing and is driven by gears 220 and 221 on opposite ends of the shaft, from a shaft 224 in power take-off unit 226 through gears 228 and 230 and respective chains 232 and 234. The rotation of sleeve 104 is accomplished by a control cable operating a pinion 158 and gear 150 in the manner previously described with reference to the previously described embodiment, like numerals being given to like parts. Power take-off unit 226 is pivotally mounted on housing 40 so that the angular position of the motor can be adjusted with respect to the power drive contained in housing 40, the shaft 24 of the motor being journaled in the power take-off unit in bearing 236 and connected to shaft 224 by a pair of beveled gears, one of which is rigidly connected to the end of shaft 24 and the other to shaft 224. Gears 220, 221, 228 and 230 and chains 232 and 234 are enclosed in guards 237 and 238, attached by suitable fixtures to the respective sides of housing 40. The operation of the drive unit shown in FIGURES 6 and 7 and the manner in which it tilts from vertical to substantially horizontal position are the same as in the twin power units.

Various changes and modifications may be made in the present power drive units whether they are used on a single or twin propeller driven boat without departing from the scope of the invention.

I claim:

1. A power plant for twin propellers of a boat having a pair of spaced openings at the junction between the hull and transom, comprising an engine mounted in the boat for driving the propellers, transmissions for said propellers, each transmission including a housing with side and top panels, a flange on said panels for engaging said hull and transom about the respective openings therein in water-tight relation, a body in said housing, horizontal pivot means supporting said body in said housing, a rotatable sleeve in said body, a leg secured to the lower end of said sleeve, a horizontal drive shaft in said leg, a propeller on one end of said shaft, a power input shaft axially positioned in the pivot means, a shaft extending concentrically through said sleeve, a pair of beveled gears operatively connecting said input shaft with said last mentioned shaft, a pair of beveled gears connecting said last mentioned shaft with said drive shaft, a gear for rotating said sleeve to rotate said leg and thereby steer the boat, a pinion for rotating said gear, a shaft means connected to said pinion and extending parallel with said sleeve to a point adjacent said pivot means, a rotatable steering control means, a flexible shaft connecting said control means with said shaft means and bendable circumferentially to said pivot means, a power takeoff means between said transmissions, a shaft connecting said power take-off means with said engine, axially aligned shafts connecting said power take-off means with said transmissions, a door for the opening in said transom, and a means connecting said door with said body for opening and closing said door when said body is rotated on said pivot means.

2. A power plant for twin propellers of a boat having a pair of spaced opening at the junction between the hull and transom, comprising an engine mounted in the boat for driving the propellers, transmissions for said propellers, each transmission including a housing with side and top panels, a body in said housing, horizontal pivot means supporting said body in said housing, a rotatable sleeve in said body, a leg secured to the lower end of said sleeve, a horizontal drive shaft in said leg, a propeller on one end of said shaft, a power input shaft axially positioned in the pivot means, a shaft extending through said sleeve, gears connecting said last mentioned shaft with said drive shaft, means including two constantly meshed gears for rotating said sleeve to rotate said leg and thereby steer the boat, a rotatable steering control means, a flexible shaft connecting said control means with said gear means and bendable circumferentially to said pivot means, a power take-off means between said transmissions, a shaft connecting said power take-off means with said engine, shafts connecting said power take-off means with said transmissions, a door for the opening in said transom, and a means connecting said door with said body for opening and closing said door when said body is rotated on said pivot means.

3. In a drive for a propeller of a boat having an opening at the junction between the hull and transom and an engine mounted in the boat for driving the propeller: a transmission for said propeller comprising a housing with side and top panels, a flange on said panels for engaging said hull and transom about the opening therein in water-tight relation, a body in said housing, horizontal pivot means supporting said body in said housing, a rotatable sleeve in said body, a leg secured to the lower end of said sleeve, a horizontal drive shaft in said leg, a propeller on one end of said shaft, a power input shaft axially positioned in the pivot means, a shaft extending concentrically through said sleeve, a pair of beveled gears operatively connecting said input shaft with said last mentioned shaft, a pair of beveled gears connecting said last mentioned shaft with said drive shaft, a gear for rotating said sleeve to rotate said leg and thereby steer the boat, a pinion for rotating said gear, a shaft means connected to said pinion and extending parallel with said sleeve to a point adjacent said pivot means, a rotatable steering control means, a flexible shaft connecting said control means with said shaft means and bendable circumferentially to said pivot means, a means operatively connecting said engine with said transmission, a door for the opening in said transom, and a means connecting said door with said body for opening and closing said door when said body is rotated on said pivot means.

References Cited in the file of this patent

UNITED STATES PATENTS

| | | |
|---|---|---|
| 2,114,633 | Hedges | Apr. 19, 1938 |
| 2,386,362 | Soldner | Oct. 9, 1945 |
| 2,458,177 | Johnson | Jan. 4, 1949 |
| 2,936,730 | Patty | May 17, 1960 |
| 2,946,306 | Leipert | July 26, 1960 |
| 2,975,750 | Smith | Mar. 21, 1961 |